United States Patent
Chen

(10) Patent No.: US 9,062,494 B2
(45) Date of Patent: Jun. 23, 2015

(54) COILABLE SHADE

(71) Applicant: Hou-Sheng Ko, Kaohsiung (TW)

(72) Inventor: Shih-Yuan Chen, Pingtung County (TW)

(73) Assignee: Hou-Sheng Ko, Kaohsiung (TW)

( * ) Notice: Subject to any disclaimer, the term of this patent is extended or adjusted under 35 U.S.C. 154(b) by 0 days.

(21) Appl. No.: 14/057,299

(22) Filed: Oct. 18, 2013

(65) Prior Publication Data

US 2014/0374036 A1 Dec. 25, 2014

(30) Foreign Application Priority Data

Jun. 25, 2013 (TW) .............................. 102122546 A

(51) Int. Cl.
| | |
|---|---|
| E06B 9/56 | (2006.01) |
| E06B 9/60 | (2006.01) |
| E06B 9/42 | (2006.01) |
| B60J 1/20 | (2006.01) |
| E06B 9/90 | (2006.01) |
| E06B 9/80 | (2006.01) |

(52) U.S. Cl.
CPC ... *E06B 9/60* (2013.01); *E06B 9/42* (2013.01); *B60J 1/2033* (2013.01); *B60J 1/205* (2013.01); *E06B 9/90* (2013.01); *E06B 2009/807* (2013.01)

(58) Field of Classification Search
CPC ........................................................ E06B 9/60
USPC ........................................ 160/291–305, 313
See application file for complete search history.

(56) References Cited

U.S. PATENT DOCUMENTS

| | | | | |
|---|---|---|---|---|
| 5,566,741 | A  * | 10/1996 | Ogawara et al. ............... | 160/297 |
| 7,147,030 | B2 * | 12/2006 | Dalle Nogare et al. ........ | 160/315 |
| 7,210,513 | B2 * | 5/2007 | Goldenberg et al. ........... | 160/31 |
| 8,356,653 | B2 * | 1/2013 | Fu-Lai et al. ............... | 160/84.05 |
| 2010/0314054 | A1* | 12/2010 | Zhu ............................... | 160/294 |
| 2011/0209836 | A1* | 9/2011 | Yu et al. ........................ | 160/305 |
| 2012/0152470 | A1* | 6/2012 | Chen ............................. | 160/292 |
| 2013/0153161 | A1* | 6/2013 | Haarer et al. ............... | 160/293.1 |
| 2013/0220561 | A1* | 8/2013 | Yu et al. ........................ | 160/340 |

* cited by examiner

*Primary Examiner* — Katherine Mitchell
*Assistant Examiner* — Scott Denion
(74) *Attorney, Agent, or Firm* — Rosenberg, Klein & Lee

(57) ABSTRACT

A coilable shade includes a main frame to which left and right fixed seats are mounted. A drum is rotatably coupled to the right fixed seat and receives a spring receiving a shaft extending through a positioning seat. An end of the coiling spring is fixed to the positioning seat. The other end of the coiling spring is fixed to a connection seat mounted to the left fixed seat. A rotating unit is mounted in a jacket and rotatably coupled to a positioning rod fixed to the left fixed seat. A fastener is slideable along a track in a rotating member of the rotating unit to control unfolding, coiling, and positioning of a shade. The rotating unit further includes a sleeve received in the rotating member. A soft ring buffer is received in an annular groove of the sleeve and contacts an inner periphery of the rotating member.

6 Claims, 7 Drawing Sheets

COILABLE SHADE

BACKGROUND OF THE INVENTION

The present invention relates to a coilable shade and, more particularly, to a coilable shade including a soft ring rubber to drive a rotating member to change a position of a track in the rotating member for controlling unfolding, coiling, and positioning of a shade as well as increasing the rotational frictional force of the rotating member and providing the buffering effect while coiling the shade.

A plurality of types of coilable shades available in the market is generally used on doors and windows in houses and offices to shield the sun as well as providing a decoration effect. FIGS. 1-3 show a conventional coilable shade 1 including a main frame 11, a coiling device 12, a pull/coil device 13 mounted to a left side of the main frame 11, a hydraulic buffering device 14 mounted to a right side of the main frame 11, and left and right fixed seats 15 and 16. In a case that the shade 17 is moved downward to a position, a coiling spring 131 at a side of the pull/coil device 13 is tensioned and IS rotates freely. If the exposed portion of the shade 17 is insufficient, the shade 17 is pulled downward again to cause coiling of the shade 17, wherein the coiling spring 131 is moved from the tensioned state to a stretched state and rotates together with the shade 17 to drive a rotating device 132 in the pull/coil device 13. The rotating device 132 includes a rotating member 133 and a sleeve 134. Two friction pads 135 made of wool felt are mounted between the rotating member 133 and the sleeve 134 and spaced from each other. If the frictional force of the friction pads 135 is insufficient, the shade 17 coils rapidly and causes noise. The hydraulic buffering device 14 reduces the coiling speed of the shade 17. providing a buffering effect.

However, the coilable shade 1 has the following disadvantages while coiling the shade 17:

(1) The friction pads 135 of the pull/coil device 13 provide insufficient friction such that the friction pads 135 can not easily drive the rotating member 133 to change the position of a track 136 on the rotating member 133, failing to provide reliable coiling or uncoiling of the shade 17.

(2) The friction pads 135 are received in recesses 1331 in an inner periphery of the rotating member 133, and the sleeve 134 is then inserted into the rotating member 133 so that the outer periphery of the sleeve 134 contacts with the friction pads 135. The overall diameter of the pull/coil device 13 is 3 cm, which is too large to be used in a small shade mounted to a door of an automobile, providing limited application.

(3) The hydraulic buffering device 14 is a necessity to the coilable shade I for buffering the shade 17, increasing the costs.

BRIEF SUMMARY OF THE INVENTION

An objective of the present invention is to provide a coilable shade to mitigate and/or obviate the above disadvantages including rapid coiling of the shade, large volume, and high costs resulting from insufficient frictional force of frictional pads that fails to position the shade in a desired location and resulting from the hydraulic buffering device required for buffering the shade.

The above objective is fulfilled by a coilable shade according to the present invention including a main frame having left and right sides. A left fixed seat is mounted to the left side of the main frame. A right fixed seat is mounted to the right side of the main frame. A cap is rotatably mounted to the right fixed seat. A coiling device includes a drum having an end in which the cap is securely mounted, a spring received in the drum and including a first end and a second end, a shaft extending through the spring and including a first end and a second end, and a positioning seat. The first end of the shaft extends through the positioning seat. The first end of the coiling spring is fixed to the positioning seat. A control device is mounted to the left fixed seat. The second end of the coiling spring is fixed to the control device. The control device is received in the drum. A shade is coilable around the drum of the coiling device.

The control device includes a jacket, a rotating unit mounted in an end of the jacket, a positioning rod rotatably coupled to the rotating unit and fixed to the left fixed seat, and a connecting seat mounted in the other end of the jacket. The shaft extends through the connecting seat. The other end of the jacket engages with a side of the coiling device. A fastener extends through an outer periphery of the jacket. The rotating unit includes a rotating member having a track and a guiding block in the track. The fastener is slideable along the track to control movement of the rotating member to control unfolding, coiling, and positioning of the shade. The rotating unit further includes a sleeve received in the rotating member. The sleeve includes an outer periphery having at least one annular groove. At least one soft ring buffer is received in the at least one annular groove and contacts an inner periphery of the rotating member.

The at least one soft ring buffer of the control device according to the present invention can drive the rotating member to change the position of the track for unfolding, coiling, and positioning of the shade. Furthermore, the rotational friction force of the rotating member and the buffering effect during coiling of the shade can be increased, allowing easy operation and easy adjustment.

The overall outer diameter of the control device according to the present invention is as small as 1.5 cm after assembly, which is not only suitable for coilable shades on doors and windows but also suitable for small shades used on doors of automobiles, providing a wider application.

The present invention will become clearer in light of the following detailed description of illustrative embodiments of this invention described in connection with the drawings.

DETAILED DESCRIPTION OF THE INVENTION

Figure 1:
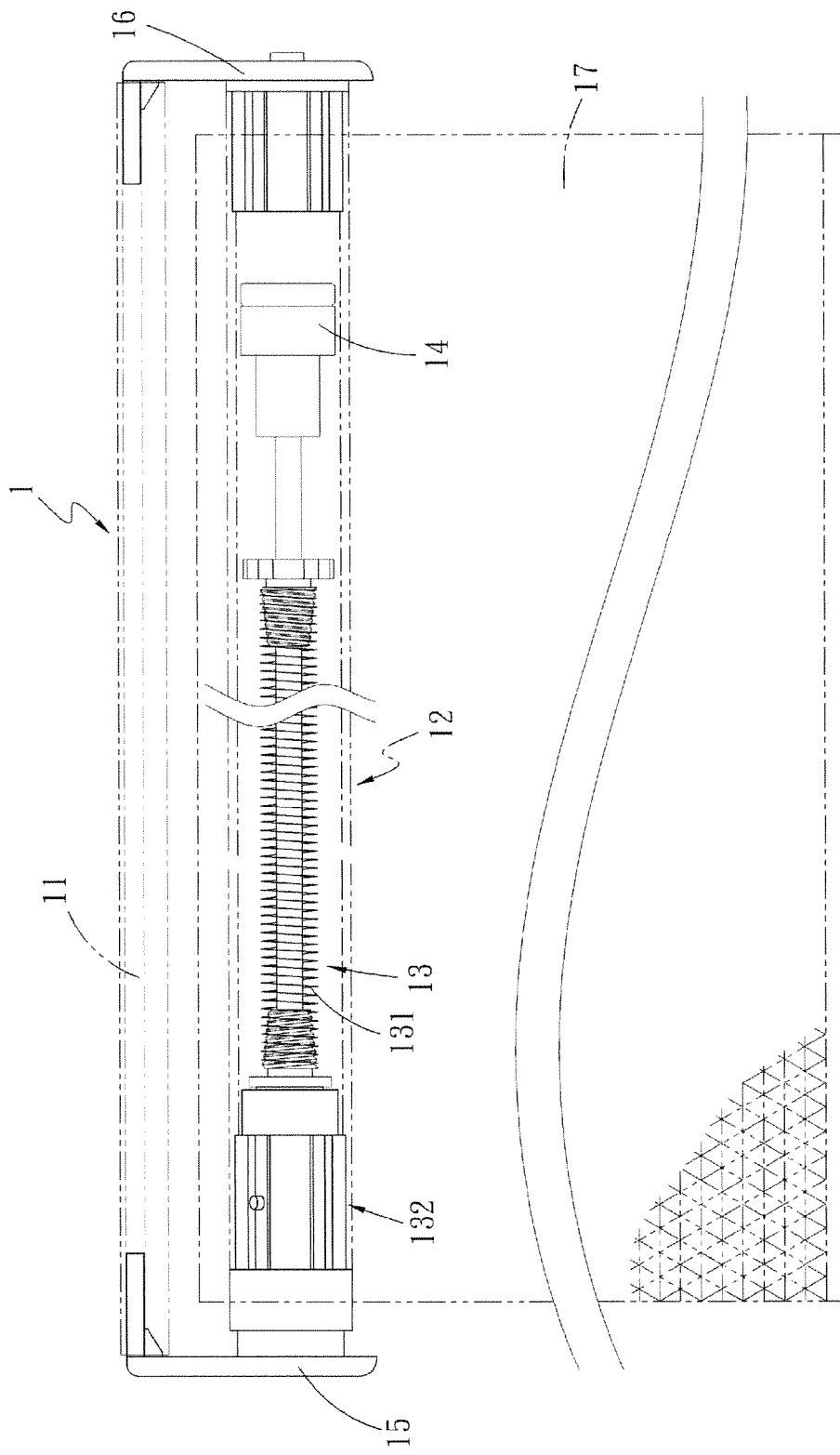
FIG. 1 is a front view of a coilable shade, with a portion of the coilable shade removed to show components in a main frame of the coilable shade.
Figure 2:
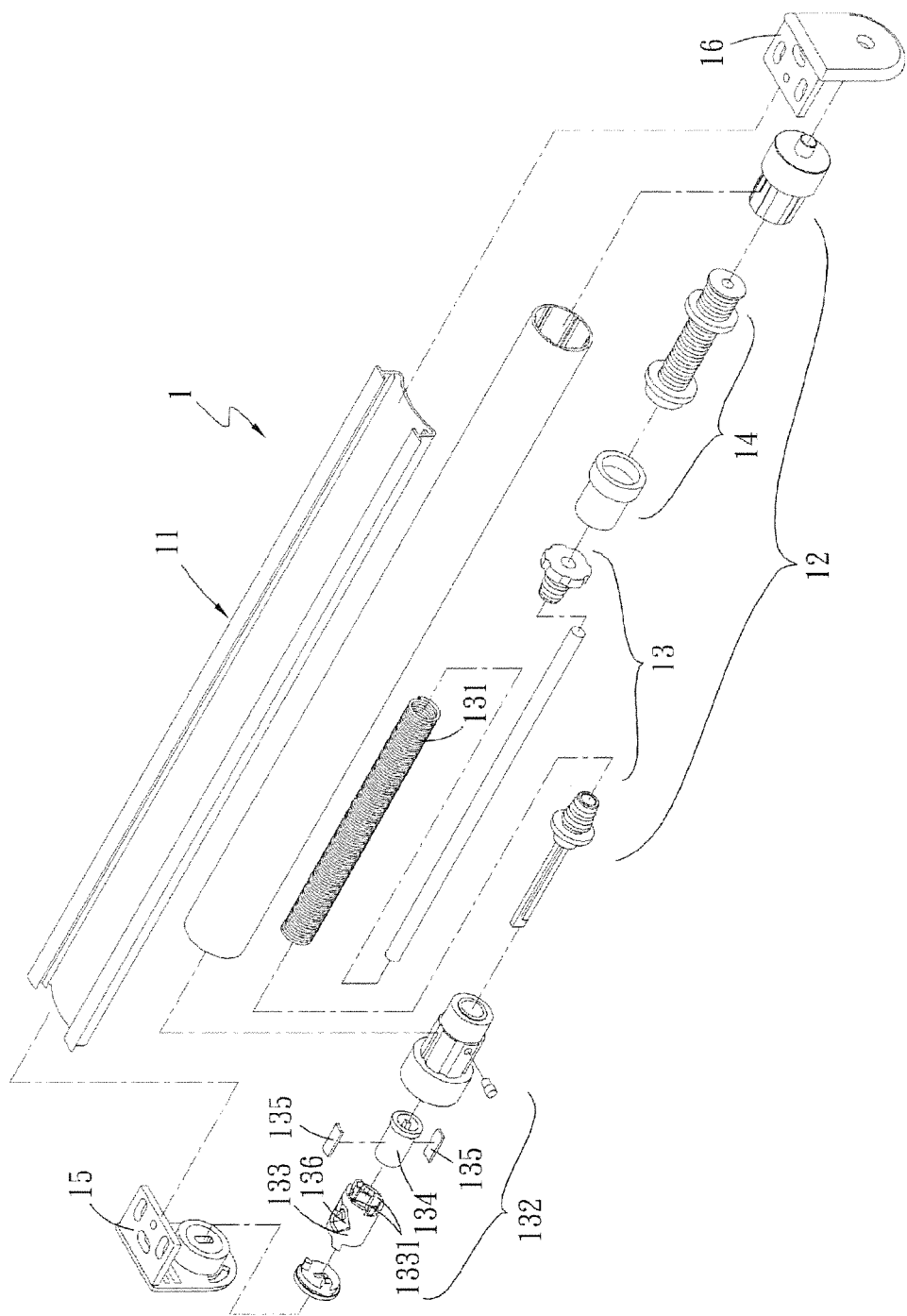
FIG. 2 is an exploded, perspective view of the main frame and the components in the main frame of the coilable shade of FIG. 1.
Figure 3:
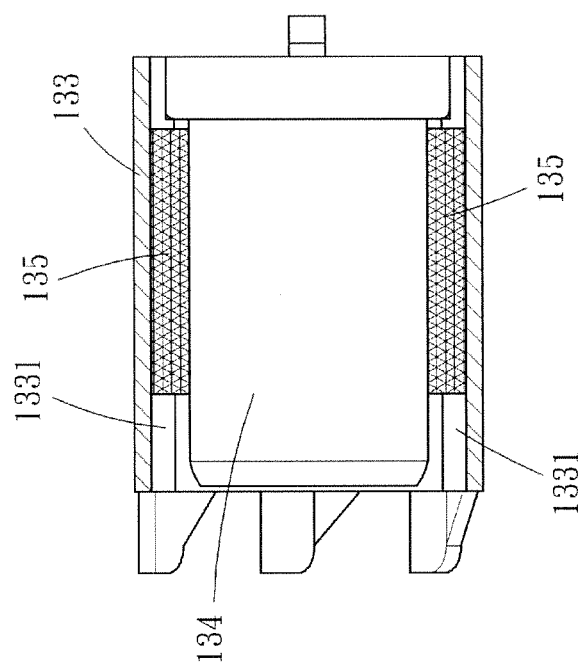
FIG. 3 is a cross sectional view of a rotating device of FIG. 2.
Figure 4:
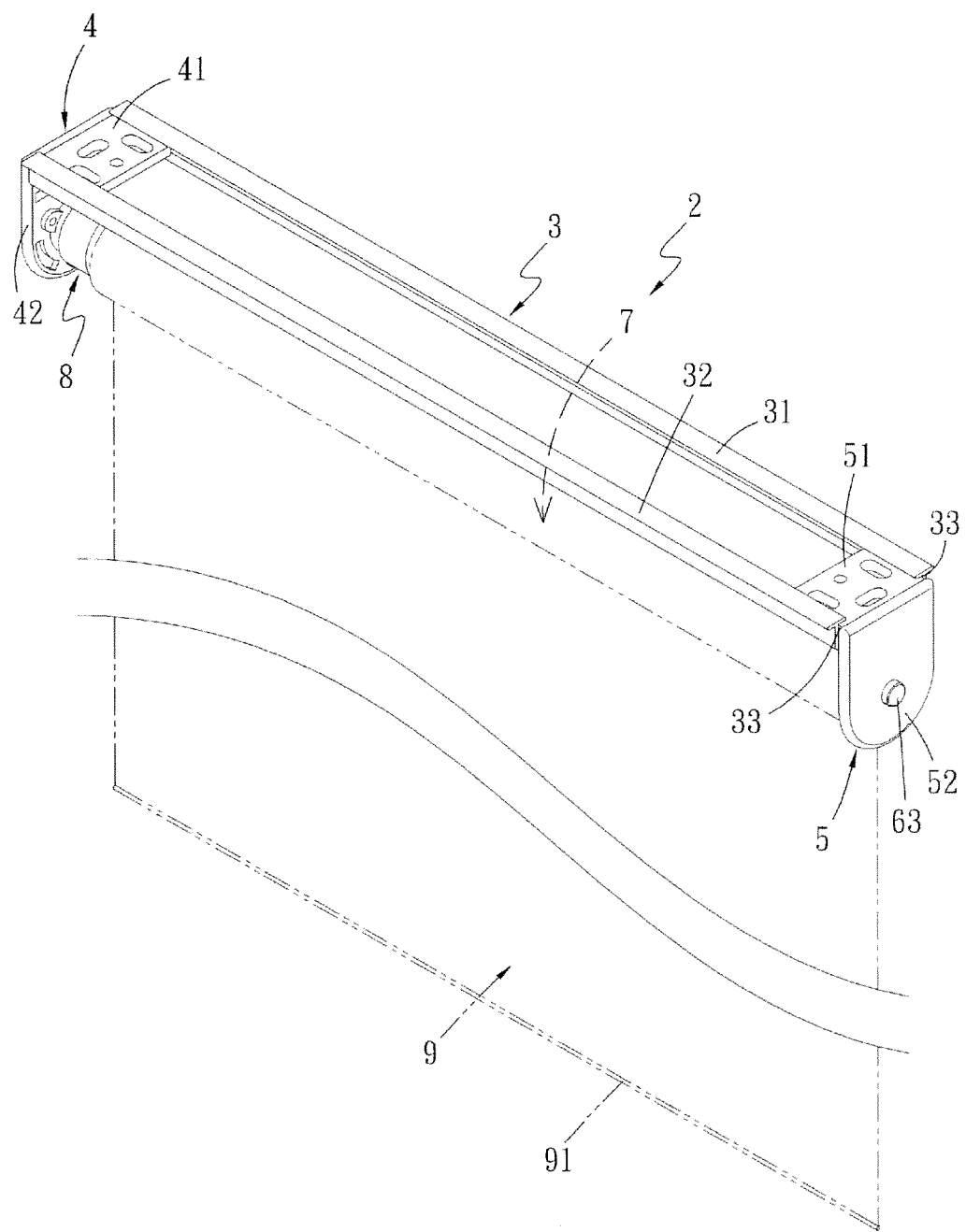
FIG. 4 is a perspective view of a coilable shade according to the present invention.
Figure 5:
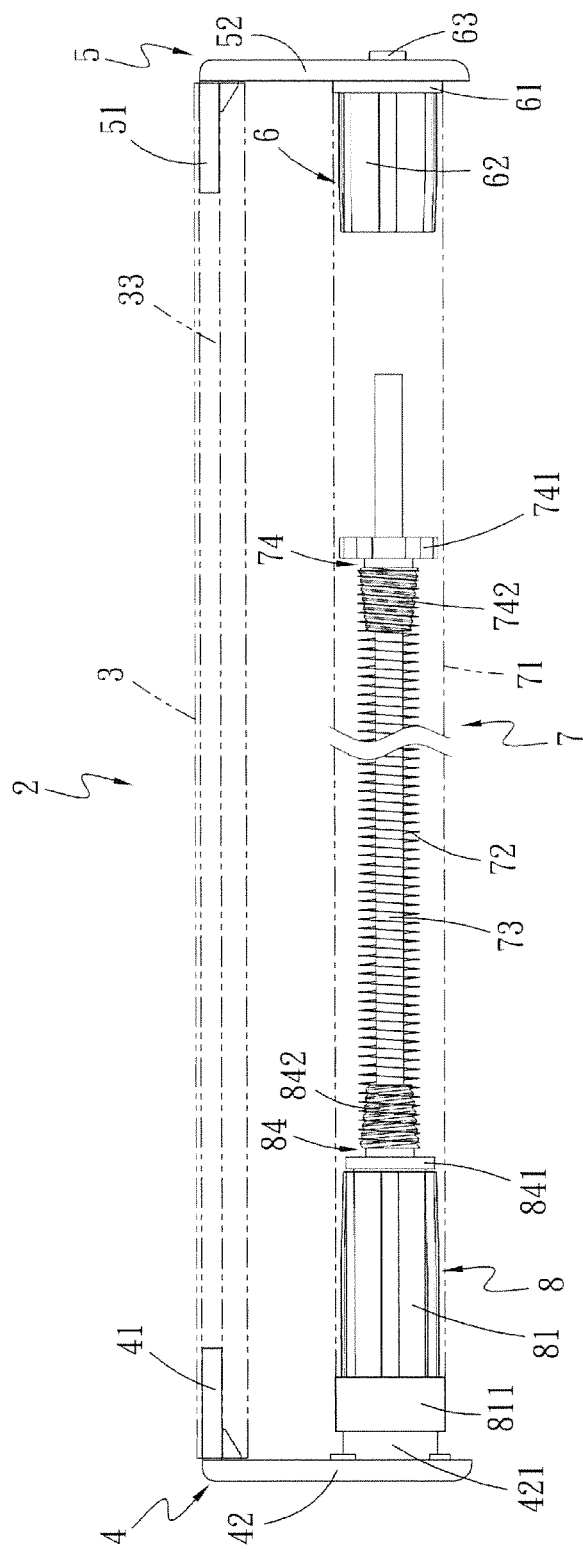
FIG. 5 is a front view of the coilable shade of FIG. 4.
Figure 6:
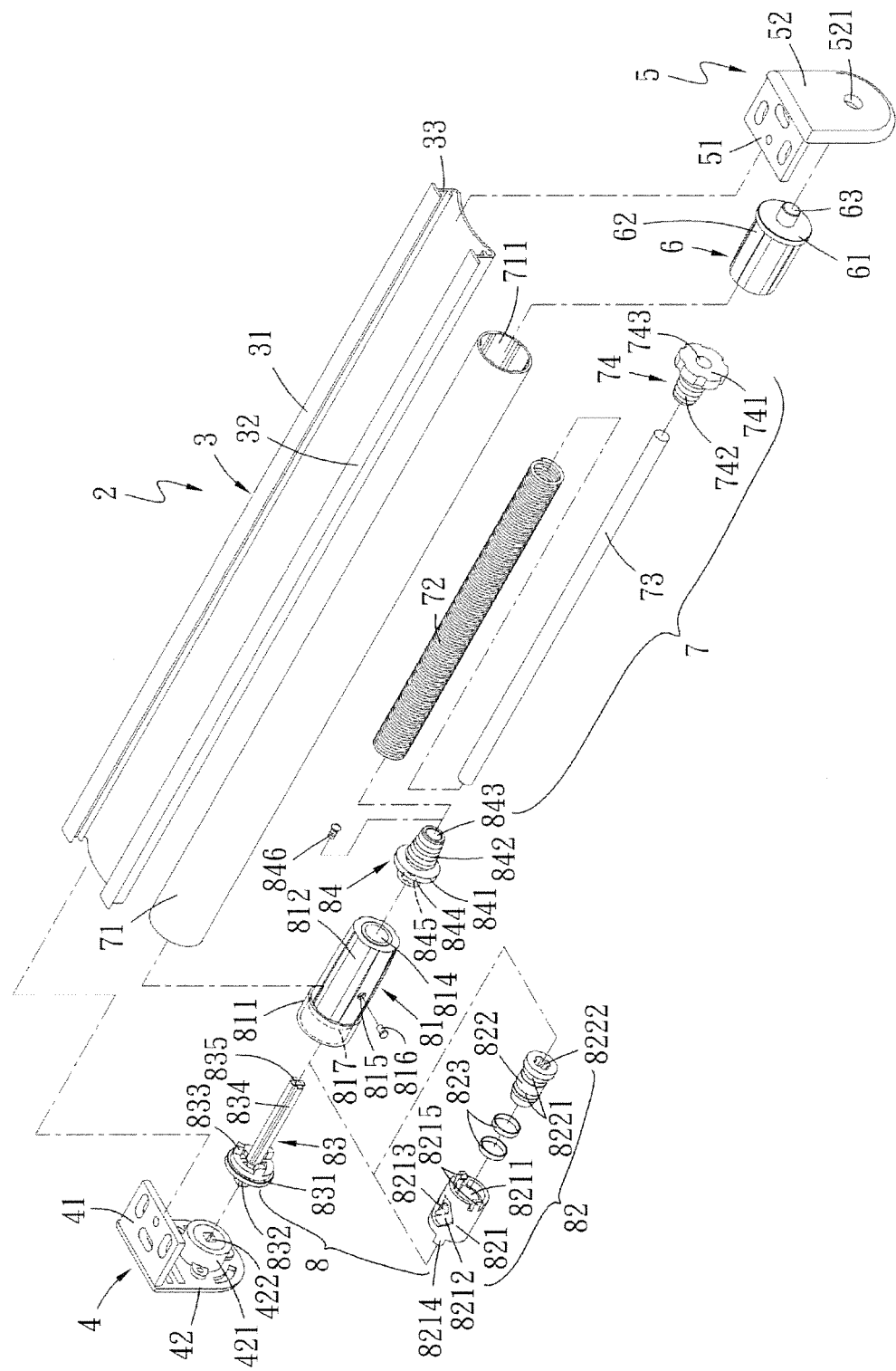
FIG. 6 is an exploded, perspective view of the coilable shade of FIG. 4.
Figure 7:
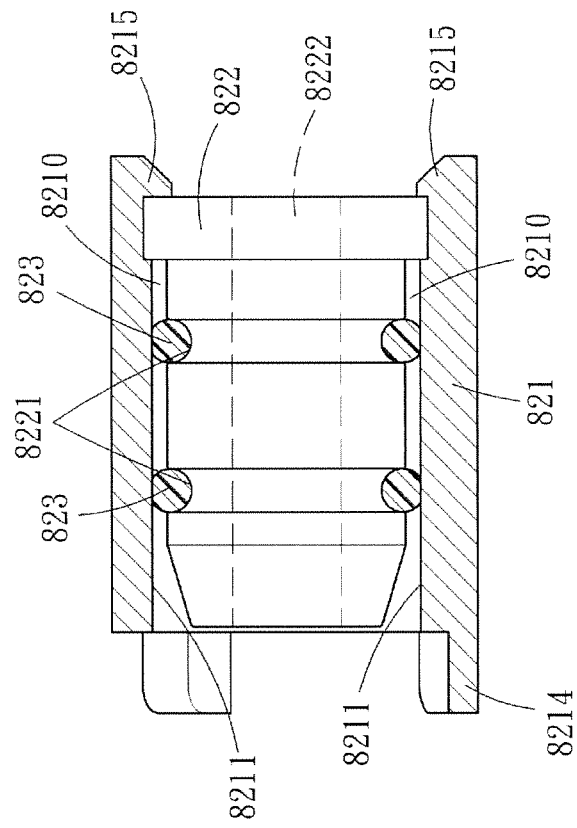
FIG. 7 is a cross sectional view of a rotating device of the coilable shade of FIG. 4.

With reference to FIGS. 4-7, a coilable shade 2 according to the present invention includes a main frame 3 having two upwardly extending abutment sides 31 and 32, with the abutment sides 31 and 32 opposite to each other. A channel 33 is defined between two inner faces of the abutment sides 31 and 32.

The coilable shade 2 further includes left and right fixed seats 4 and 5 opposite to each other and respectively mounted to left and right sides of the main frame 3. The left fixed seat 4 includes a left fixed board 41 and a left positioning board 42 extending downward from an outer end of the left fixed board 41. The right fixed seat 5 includes a right fixed board 51 and a right positioning board 52 extending downward from an outer end of the right fixed board 51. The left and right fixed boards 41 and 51 are inserted into the channel 33 defined between the abutment sides 31 and 32 of the main frame 3. Each of the left and right fixed boards 41 and 51 has a plurality of fixing holes. Fasteners extend through the fixing holes into a wall face. A protrusion 421 is formed on an inner face of the left positioning board 41 and has a square axle hole 422. A hole 521 is defined in the right positioning board 52 and aligned with the square axle hole 422.

The coilable shade 2 further includes a cap 6 is rotatably mounted to the right fixed seat 5. The cap 6 includes a stop face 61. A bulge extends from a side of the stop face 61. An axle 63 protrudes from the other side of the stop face 61 facing the hole 521 of the right positioning board 52. The axle 63 is rotatably received in the hole 521.

The coilable shade 2 further includes a coiling device 7 having a drum 71, a coiling spring 72, a shaft 73, and a positioning seat 74. The drum 71 has a hollow interior 711. The bulge 62 of the cap 6 is securely engaged in an end of the drum 71. The coiling spring 72 is received in the hollow interior 711 of the drum 71. The shaft 73 extends through an interior of the coiling spring 72. The positioning seat 74 includes a right stop 741 having a side from which a right threaded portion 742 protrudes. An end of the coiling spring 72 is securely mounted around the right threaded portion 742. The right threaded portion 742 has a right axle hole 743 through which an end of the shaft 73 extends. Thus, coiling spring 72 can be stretched or returned by the end of the shaft 73.

The coilable shade 2 further includes a control device 8 fixed to the left fixed seat 4 and coupled to the coupling device 7. The control device 8 includes a jacket 81, a rotating unit 82 mounted in an end of the jacket 81, a positioning rod 83 rotatably coupled to the rotating unit 82, and a connecting seat 84 mounted in the other end of the jacket 81. The jacket 81 includes a stop portion 811 having a side facing the drum 71. An engagement portion 812 protrudes from the side of the stop portion 811 and is securely engaged in the hollow interior 711 of the drum 71. The engagement portion 812 includes a through-hole 814 in an end thereof. The engagement portion 812 further includes a screw hole 815 through which a fastener 816 extends, with the fastener 816 serving as a guiding rod. The jacket 81 further includes a receiving space 817 facing the rotating unit 82 and the protrusion 421 of the left positioning board 42.

The rotating unit 82 includes a rotating member 821, a sleeve 822, and at least one soft ring buffer 823. The rotating member 821 includes a through-hole 8211 therein. The rotating member 821 further includes a track 8212 in an outer periphery thereof and a guiding block 8213 in the track 8212. The fastener 816 is slideable along the track 8212 to control movement of the rotating member 821 upon movement of the shade 9, thereby controlling unfolding, coiling and positioning of the shade 9. A side of the rotating member 821 facing the left fixed board 42 includes a plurality of projections 8214. The other side of the rotating member 821 facing an interior of the sleeve 81 includes two pressing blocks 8215.

After the sleeve 822 is mounted in the through-hole 8211 of the rotating member 821, the pressing blocks 8215 press against the sleeve 822 and prevent the sleeve 822 from disengaging from the rotating member 821. The sleeve 822 includes at least one annular groove 8221 in an outer periphery thereof, with a gap 8210 defined between the outer periphery of the sleeve 822 and an inner periphery of the through-hole 8211 of the rotating member 821. In this embodiment, the sleeve 822 includes two annular grooves 8221, and the sleeve 822 has an axial hole 8222. Two soft ring buffers 823 are respectively received in the annular grooves 8221. Each soft ring buffer 823 has an outer diameter larger than an inner diameter of the rotating member 821 such that the soft ring buffer 823 pressing against the inner periphery of the through-hole 8211. Each soft ring buffer 823 can be made of silicon rubber to increase the friction force and heat resisting effect of the rotating member 821, which can be used to replace the buffering effect of the buffering device in conventional coilable shades.

The positioning rod 83 includes a circular stop 831 received in the receiving space 817 of the sleeve 81. A side of the circular stop 831 facing the square axle hole 422 includes an axle 832 having a shape corresponding to the square axle hole 422. The other side of the circular stop 831 facing the rotating member 821 includes a plurality of projections 833 for engaging with the projections 8214 for positioning purposes. A spindle 834 protrudes from the other side of the circular stop 831 and has a shape corresponding to the axial hole of the sleeve and the coupling hole of the connecting seat. The spindle 834 has a screw hole 835 in an end thereof.

The connecting seat 84 includes a left stop 841. A left threaded portion 842 protrudes from a side of the left stop 841. The other end of the coiling spring 72 is securely mounted around the left threaded portion 842. The left threaded portion 842 includes a left axle hole 843. The other end of the shaft 73 extends through and engages in the left axle hole 843. A coupling section 844 protrudes from the other side of the left stop 841 and includes a coupling hole 845 aligned with the left axle hole 843. The spindle 834 extends through the axial hole 8222 of the sleeve 822 and is fixed in the coupling hole 845 of the connecting seat 84. A crew 846 extends through the left axle hole 843 and is threadedly engaged in the screw hole 835.

A shade 9 includes an end coiled around the outer periphery of the drum 71. A pull rod 91 is fixed to the other end of the shade 9.

After assembling the above components to form the coilable shade 2, when the pull rod 91 is manually pulled downward for a short period of time, if the shade 9 is unfolded in the clockwise direction, the coiling spring 72 of the coiling device 7 coupled to the control device 8 is stretched outward and rotates freely around the shaft 73. The rotating force of the coiling spring 72 is smaller than the frictional force of the soft ring buffers 823 such that the shade 9 is unfolded smoothly. If it is desired to coil the shade 9 by rotation in the counterclockwise direction, the coiling spring 72 of the coiling device 7 is tensioned and drives the rotating unit 82 of the control device 9 to rotate jointly. Due to provision of the soft ring buffers 823 made of silicon rubber and mounted between the sleeve 822 and the rotating member 821, when the rotating unit 82 rotates in the counterclockwise direction, the soft ring buffers 823 drives the rotating member 821 to change the position of the track 8212 to achieve unfolding, coiling, and positioning of the shade 9. This also provides a buffering effect to rotation of the rotating member 821 and coiling of the shade 9, which can be used to replace the buffering effect provided by the hydraulic buffering device in conventional coilable shades.

The overall outer diameter of the control device 8 of the coilable shade 12 according to the present invention can be as small as 1.5 cm after assembly, which is not only suitable for coilable shades on doors and windows but also suitable for small shades used on doors of automobiles, providing a wider application.

In view of the foregoing, the coilable shade 12 according to the present invention can easily be operated and can be retained in any desired position, providing improvements over the conventional coilable shades.

Although specific embodiments have been illustrated and described, numerous modifications and variations are still possible without departing from the scope of the invention. The scope of the invention is limited by the accompanying claims.

The invention claimed is:

1. A coilable shade comprising:
a main frame having left and right sides;
a left fixed seat mounted to the left side of the main frame;
a right fixed seat mounted to the right side of the main frame, a cap rotatably mounted to the right fixed seat;
a coiling device including:
   a drum, with the cap securely mounted in an end of the drum;
   a spring received in the drum and including a first end and a second end;
   a shaft extending through the spring and including a first end and a second end; and
   a positioning seat, the first end of the shaft extending through the positioning seat, the first end of the spring fixed to the positioning seat;
a control device mounted to the left fixed seat, the second end of the coiling spring fixed to the control device, the control device received in the drum; and
a shade coilable around the drum of the coiling device,
wherein the control device includes a jacket, a rotating unit mounted in an end of the jacket, a positioning rod rotatably coupled to the rotating unit and fixed to the left fixed seat, and a connecting seat mounted in another end of the jacket, the shaft extending through the connecting seat, the other end of the jacket engaged with a side of the coiling device, a fastener extending through an outer periphery of the jacket,
the rotating unit including a rotating member having a track and a guiding block in the track, the fastener being slideable along the track to control movement of the rotating member to control unfolding, coiling, and positioning of the shade,
the rotating unit further including a sleeve received in the rotating member, the sleeve including an outer periphery having at least one annular groove formed to extend continuously thereabout,
at least one soft ring buffer received in the at least one annular groove to remain annularly captured between the sleeve and an inner periphery of the rotating member.

2. The coilable shade as claimed in claim 1, wherein the jacket includes a stop portion having a side facing the drum, an engagement portion protruding from the side of the stop portion and securely engaged in the drum, and a receiving space, receiving the rotating unit and the left fixed board.

3. The coilable shade as claimed in claim 2, wherein the at least one soft ring buffer is made of silicon rubber and matched with the at least one annular groove.

4. The coilable shade as claimed in claim 3, wherein a gap is formed between the outer periphery of the sleeve and the inner periphery of the rotating member, the gap allowing insertion of the at least one soft ring buffer.

5. The coilable shade as claimed in claim 4, wherein the at least one soft ring buffer has an outer diameter larger than an inner diameter of the inner periphery of the rotating member.

6. The coilable shade as claimed in claim 5, wherein the sleeve includes an axial hole, the left fixed board including a protrusion having a square axle hole, the connecting seat including a left stop, a left threaded portion protruding from a side of the left stop, the second end of the coiling spring securely mounted around the left threaded portion, the left threaded portion having a left axle hole, the second end of the shaft engaged in the left axle hole, a coupling section protruding from another side of the left stop and including a coupling hole aligned with the left axle hole, the positioning rod including a circular stop, an axle formed on a side of the circular stop and having a shape corresponding to the square axle hole, a spindle protruding from another side of the circular stop, the spindle having a shape corresponding to the axial hole of the sleeve and the coupling hole of the connecting seat, the spindle having a screw hole in an end thereof, a screw extending through the screw hole to connect the connecting seat with the spindle.

* * * * *